(12) United States Patent
Saito et al.

(10) Patent No.: US 12,204,148 B2
(45) Date of Patent: Jan. 21, 2025

(54) OPTICAL CONNECTING DEVICE, OPTICAL DEVICE, AND METHOD FOR MANUFACTURING OPTICAL DEVICE

(71) Applicant: Nippon Telegraph and Telephone Corporation, Tokyo (JP)

(72) Inventors: Yohei Saito, Tokyo (JP); Kota Shikama, Tokyo (JP); Makoto Abe, Tokyo (JP); Norio Sato, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 232 days.

(21) Appl. No.: 17/909,037

(22) PCT Filed: Apr. 1, 2020

(86) PCT No.: PCT/JP2020/015025
§ 371 (c)(1),
(2) Date: Sep. 2, 2022

(87) PCT Pub. No.: WO2021/199377
PCT Pub. Date: Oct. 7, 2021

(65) Prior Publication Data
US 2023/0089592 A1    Mar. 23, 2023

(51) Int. Cl.
*G02B 6/26* (2006.01)
*G02B 6/138* (2006.01)
*G02B 6/30* (2006.01)

(52) U.S. Cl.
CPC .............. *G02B 6/26* (2013.01); *G02B 6/138* (2013.01); *G02B 6/30* (2013.01)

(58) Field of Classification Search
CPC . G02B 6/26; G02B 6/30; G02B 6/305; G02B 6/138
USPC .................................................... 385/38
See application file for complete search history.

(56) References Cited

U.S. PATENT DOCUMENTS

| 4,666,236 A | * | 5/1987 | Mikami | ................ G02B 6/305 250/227.24 |
| 6,081,632 A | * | 6/2000 | Yoshimura | ............... G02B 6/14 385/5 |
| 7,949,219 B1 | * | 5/2011 | Karras | ..................... G02B 6/26 385/50 |

(Continued)

FOREIGN PATENT DOCUMENTS

| EP | 1835315 A1 | * | 9/2007 |
| JP | 2017227770 A | | 12/2017 |

OTHER PUBLICATIONS

English translation of written opinion for PCT/JP2020/015025, dated Aug. 18, 2020 (3 pages). (Year: 2020).*

(Continued)

*Primary Examiner* — Michael Stahl
(74) *Attorney, Agent, or Firm* — Slater Matsil, LLP

(57) ABSTRACT

An optical connection element includes a first waveguide core and a second waveguide core above a substrate or a cladding and in which signal light and resin curing light propagate through the first waveguide core and the second waveguide core, the optical connection element including: an inter-core light coupling section in which a part of the first waveguide core and a part of the second waveguide core overlap in a perpendicular direction; and a resin curing light coupling section that couples resin curing light to the second waveguide core.

8 Claims, 16 Drawing Sheets

(56) References Cited

U.S. PATENT DOCUMENTS

| | | | | |
|---|---|---|---|---|
| 2009/0324172 A1* | 12/2009 | Haga | ...................... | G02B 6/138 |
| | | | | 264/1.25 |
| 2011/0177259 A1* | 7/2011 | Sato | ...................... | G02B 1/045 |
| | | | | 427/559 |
| 2013/0221550 A1* | 8/2013 | Koos | ...................... | G02B 6/138 |
| | | | | 264/1.25 |
| 2019/0079244 A1* | 3/2019 | Fujiwara | ............... | G02B 6/1221 |
| 2023/0049310 A1* | 2/2023 | Saito | ........................ | G02B 6/13 |

OTHER PUBLICATIONS

Hirose et al. "Simple optical connection technology by Self-Formed Waveguide," Optical wiring board technology, Journal of Electronics Mounting Society vol. 5, No. 5, 2002, pp. 449-454.

Saito et al. "Tapered Self-Written Waveguide between Silicon Photonics Chip and Standard Single-Mode Fiber", OFC 2020, Mar. 8, 2020, 3 pages.

\* cited by examiner

OPTICAL CONNECTING DEVICE, OPTICAL DEVICE, AND METHOD FOR MANUFACTURING OPTICAL DEVICE

CROSS-REFERENCE TO RELATED APPLICATIONS

This application is a national phase entry of PCT Application No. PCT/JP2020/015025, filed on Apr. 1, 2020, which application is hereby incorporated herein by reference.

TECHNICAL FIELD

The present invention relates to an optical connection element for connecting an optical element, an optical element using the optical connection element, and a method for manufacturing the optical element.

BACKGROUND

With the progress of optical communication networks, optical communication devices have been required to be highly functional and space-saving, and in order to meet this requirement, the miniaturization of the optical communication devices by high-density integration is in progress. In the integration of the optical communication devices, it is necessary to connect different optical devices such as a semiconductor laser, an optical switch, and an optical fiber with low loss, and hence the optical connection for realizing the connection of those devices plays an important role.

In the optical connection, precise positioning between optical devices is important. For example, in an optical connector used for general-purpose applications, highly accurate precision components are used to keep an optical axis deviation between waveguides within 1 μm, and for mounting optical communication devices, design and precision components with that strict tolerance taken into account are essential.

Therefore, in order to realize the strict tolerance, there are many rate-determining steps in the process of mounting the optical communication device. This has increased the manufacturing cost of the optical communication device and as a result contributed to inhibiting the expansion of the applications of the devices.

There is a self-written waveguide (hereinafter referred to as an "SWW") as a technique capable of relaxing the positioning accuracy between optical devices required for the optical connection. The SWW refers mainly to a waveguide core formed by an increase in refractive index with light and by using this, the tolerance at the time of optical connection can be relaxed.

The outline of the optical connection by the SWW will be described below. The optical connection by the SWW is realized by three major steps.

First, photocurable resin is dropped into a gap between waveguides. It is assumed that at this time, signal light for transmitting an optical communication signal is emitted from an end face of at least one waveguide core.

Next, resin curing light, which is light for curing the photocurable resin, is applied from each waveguide. At this time, the SWW is first formed from the end face of each waveguide due to the property of the photocurable resin, which is the property of being cured sequentially from a position with high light intensity. Thus, the SWW is always formed on the end face of the waveguide core.

Further, due to the same property, even when there is an optical axis deviation or a gap between the waveguide cores, the SWW with a bend is formed to compensate for the deviation or gap, so that the waveguides are connected to each other with low loss.

Finally, after an uncured portion of the photocurable resin is subjected to washout or the like, resin for cladding is dropped onto the portion and cured to form solid cladding, and the optical connection by the SWW is completed.

The SWW is basically formed in the shape of a waveguide with almost a uniform diameter. On the other hand, it is also known that when the intensity of the resin curing light is sufficiently high, the waveguide becomes a tapered waveguide gradually expanding in a traveling direction of the resin curing light.

In principle, the present technique is a connection technique having an axis deviation compensation effect that can realize low-loss connection even when there is a gap or an optical axis deviation between waveguides, which is a factor of connection loss between waveguides, so that the positioning accuracy required for mounting an optical device can be relaxed. It is thus possible to relax tolerance requirements for components constituting an optical device and to thereby realize simple optical connection and reduction in manufacturing cost.

The conventional optical connection by the SWW is mostly applied to an optical device having a waveguide core made of a quartz material, such as an optical fiber or a quartz optical plane circuit. On the other hand, there have been few reports on application to an optical semiconductor device having a waveguide core made of a semiconductor material used as a light source or an optical switch constituting an optical communication device.

Because of a high refractive index of the semiconductor material, the optical semiconductor device can be made to have a small bending radius and is excellent in integration. In recent years, especially, silicon photonics using silicon (Si) as a waveguide core has attracted attention in combination with the process compatibility of its manufacturing process with the complementary metal-oxide semiconductor (CMOS).

However, in the optical connection of those devices, positioning accuracy and strict tolerance at the time of connection are required more than in the case of the conventional optical devices using the quartz material as the waveguide core, and there has been a problem that a process load of the optical connection increases. This is because, generally in optical connection, the smaller the mode field diameter (hereinafter referred to as an "MFD") of light in a waveguide, the stricter the tolerance requirement at the time of optical connection, and hence the optical connection of an optical semiconductor device having a minute MFD requires a high-precision positioning technique. As a method for solving the problem, the application of the optical connection by the SWW, which can relax the positioning accuracy, to the optical semiconductor device is expected.

CITATION LIST

Non-Patent Literature

Non-Patent Literature 1: Naohiro HIROSE et al., "Optical Component Coupling Using Self-Written Waveguides", Journal of The Japan Institute of Electronics Packaging, Vol. 5, No. 5, (2002).

SUMMARY

Technical Problem

However, at present, it is difficult to apply the optical connection by the SWW to optical semiconductor devices. This is because it is difficult to emit resin curing light from the end face of a waveguide, from which signal light necessary for the optical connection by the SWW is emitted.

This is attributable to the fact that in the optical semiconductor device, while the signal light propagates in the waveguide core of the semiconductor material, the semiconductor material has strong optical absorption with respect to light in a visible band, which is a wavelength band where the resin curing light mainly exists, so that the resin curing light cannot propagate in the waveguide core of the optical semiconductor device at all.

Embodiments of the present invention have been made in order to solve the above problem and enables application of optical connection by an SWW to an optical semiconductor device.

Means for Solving the Problem

For solving the problem as described above, an optical connection element according to embodiments of the present invention is an optical connection element that includes a first waveguide core and a second waveguide core above a substrate or cladding and in which signal light and resin curing light propagate through the first waveguide core and the second waveguide core, the optical connection element including: an inter-core light coupling section in which a part of the first waveguide core and a part of the second waveguide core overlap in a perpendicular direction; and a resin curing light coupling section that couples the resin curing light to the second waveguide core.

A method for manufacturing an optical element according to embodiments of the present invention is a method for manufacturing an optical element including an optical connection element that has a first waveguide core, a second waveguide core, an intermediate cladding layer, and an upper cladding layer above a substrate or a lower cladding section and in which signal light and resin curing light propagate through the first waveguide core and the second waveguide core, and a self-written waveguide connected to an end face of the second waveguide core, the method including: forming the first waveguide core on the substrate or the lower cladding section; forming the intermediate cladding layer on the first waveguide core; forming the second waveguide core on the intermediate cladding layer such that a part of the first waveguide core and a part of the second waveguide core overlap in a perpendicular direction; forming the upper cladding layer on the second waveguide core; placing a material of the self-written waveguide on the end face of the second waveguide core; propagating the resin curing light to the second waveguide core; and irradiating the material of the self-written waveguide with the resin curing light to increase a refractive index of the material of the self-written waveguide and form a core of the self-written waveguide.

Effect of Embodiments of the Invention

According to embodiments of the present invention, it is possible to make low-loss optical connection of optical elements made of various materials without requiring highly accurate positioning.

DETAILED DESCRIPTION OF ILLUSTRATIVE EMBODIMENTS

First Embodiment

An optical connection element according to a first embodiment of the present invention will be described with reference to FIGS. 1 to 4.

<Configuration of Optical Connection Element>

Figure 1:
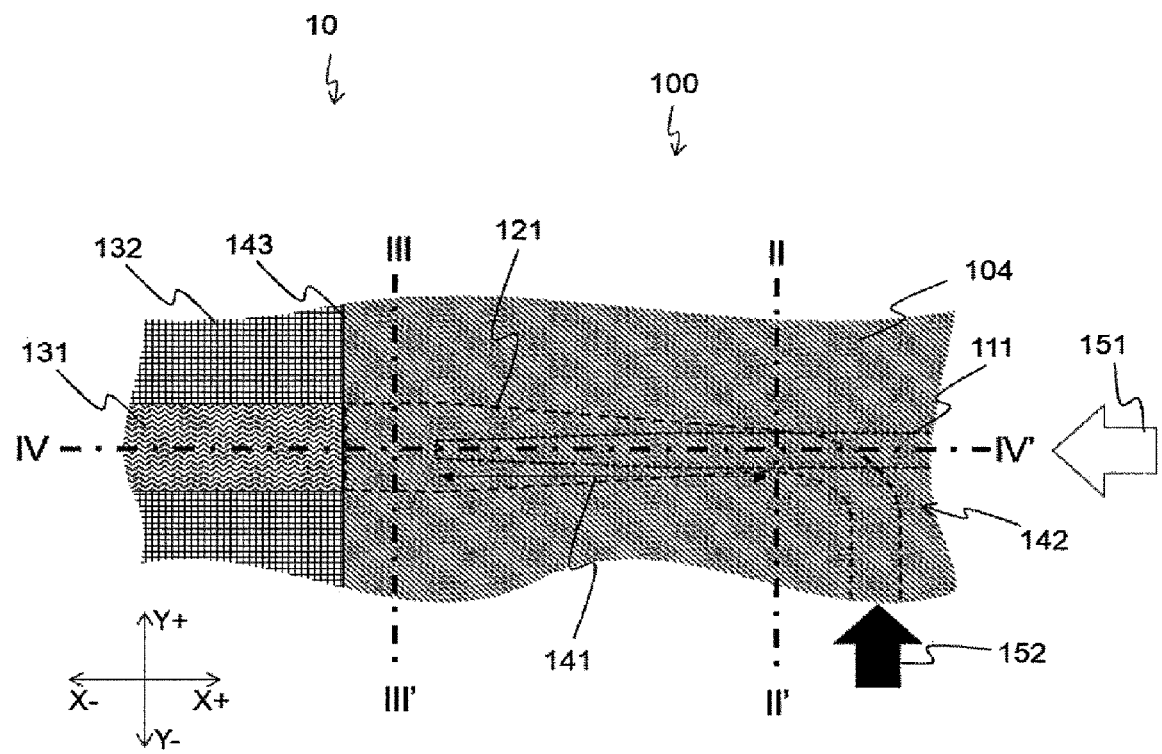
FIG. 1 is a top perspective view of an optical element including an optical connection element according to a first embodiment of the present invention.
Figure 2:
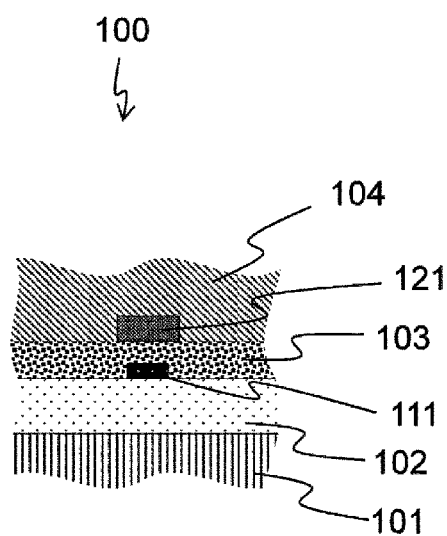
FIG. 2 is a cross-sectional view taken along line II-II' of an optical element including the optical connection element according to the first embodiment of the present invention.
Figure 3:
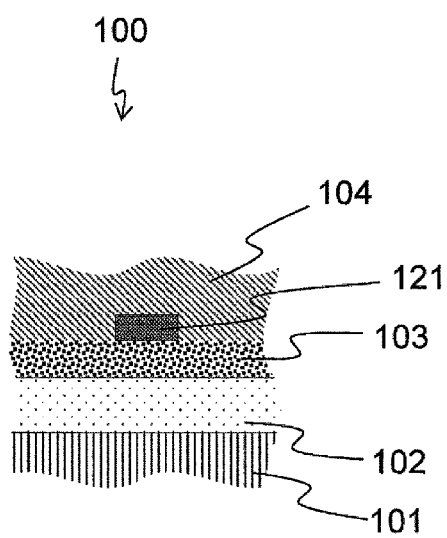
FIG. 3 is a cross-sectional view taken along line III-III' of the optical element including the optical connection element according to the first embodiment of the present invention.
Figure 4:
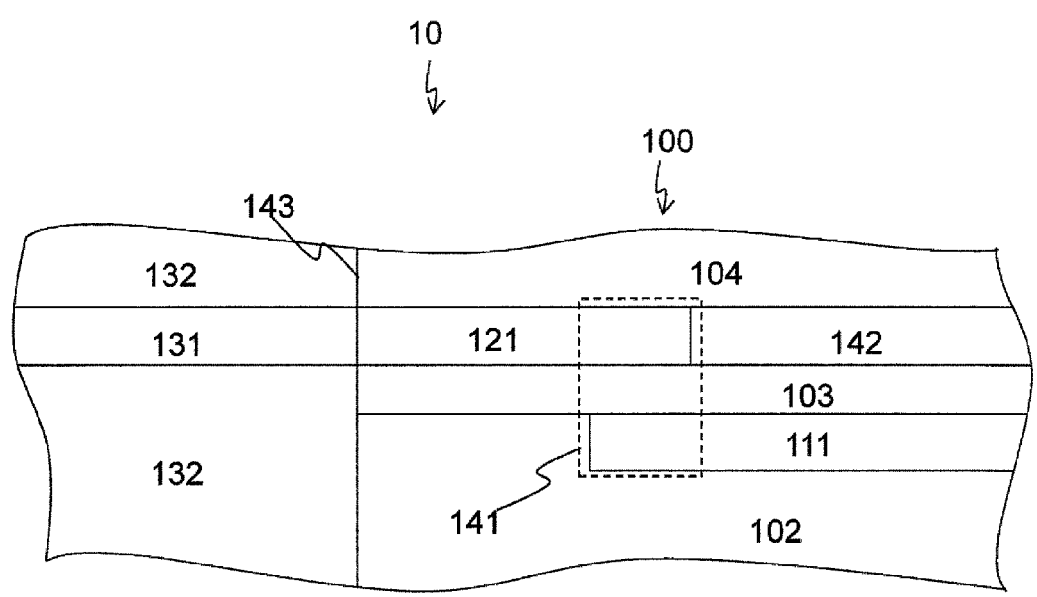
FIG. 4 is a cross-sectional view taken along line IV-IV' of the optical element including the optical connection element according to the first embodiment of the present invention.

FIG. 1 is a top perspective view of an optical element 10 including an optical connection element 100 according to the first embodiment of the present invention, FIG. 2 is a cross-sectional view taken along line II-II' in FIG. 1, FIG. 3 is a cross-sectional view taken along line III-III' in FIG. 1, and FIG. 4 is a cross-sectional view taken along line IV-IV' in FIG. 1. As illustrated in FIG. 1, a direction perpendicular to an emission end face 143 is defined as an X direction, and a direction perpendicular to the X direction on a horizontal plane parallel to a surface of the optical element 10 is defined as a Y direction. A direction perpendicular to the horizontal plane is defined as a Z direction (perpendicular direction).

A waveguide structure has a "length" in a direction parallel to a light propagation direction on a horizontal plane, a "width" in a direction perpendicular to the light propagation direction, and a "thickness" in a direction perpendicular to the horizontal plane.

The optical element 10 includes the optical connection element 100 and includes a third waveguide core 131 and a third waveguide cladding 132 on the emission end face 143 of the optical connection element 100.

The optical connection element 100 includes a first waveguide core 111 and a second waveguide core 121. The first waveguide core 111 is formed in the X direction and has a front edge located at a position away from the emission end face 143. The second waveguide core 121 is formed such that a part thereof overlaps a part of the first waveguide core 111 in the perpendicular direction (described later) and has a front edge in contact with the emission end face 143.

Signal light 151 propagates through the first waveguide core 111, is coupled to the second waveguide core 121 in an inter-core light coupling section 141, propagates through the second waveguide core 121, and is emitted from the emission end face 143. The signal light 151 propagates from the third waveguide core 131 to the first waveguide core 111 via the emission end face 143 and the second waveguide core 121. Meanwhile, resin curing light 152 is coupled to the second waveguide core 121 in a resin curing light coupling section 142, propagates through the second waveguide core 121, and is emitted from the emission end face 143.

As illustrated in FIG. 2, the optical connection element 100 includes the first waveguide core 111 formed on a lower cladding layer on a substrate 101 and an intermediate cladding layer 103 covering the first waveguide core 111, and includes the second waveguide core 121 formed on the intermediate cladding layer 103 and an upper cladding layer 104 covering the second waveguide core 121 in the inter-core light coupling section 141 (described later).

Further, as illustrated in FIG. 3, the optical connection element 100 does not have the first waveguide core 111 in a region between the inter-core light coupling section 141 (described later) and the emission end face 143 but includes the intermediate cladding layer 103 formed on the lower cladding layer on the substrate 101 and includes the second waveguide core 121 formed on the intermediate cladding layer 103 and an upper cladding layer 104 covering the second waveguide core 121. Hereinafter, with respect to the intermediate cladding layer 103, the upper cladding layer 104 side is taken as being "upper," and a lower cladding layer 102 side is taken as being "lower."

The optical element 10 according to the present embodiment includes the third waveguide core 131 in contact with an end edge of the second waveguide core 121 of the emission end face 143 of the optical connection element 100, and the third waveguide cladding 132 covering the third waveguide core 131.

Further, the inter-core light coupling section 141 is provided to realize the transfer of optical power between the first waveguide core 111 and the second waveguide core 121, and the resin curing light coupling section 142 exists in the opposite direction to a direction in which light propagates from the inter-core light coupling section 141 toward the emission end face 143.

As illustrated in FIG. 1, a region where a part of the first waveguide core 111 and a part of the second waveguide core 121 overlap each other in the Z direction (perpendicular direction) when viewed from above is the inter-core light coupling section 141. The inter-core light coupling section 141 has a specific configuration such that it is basically formed of parallel waveguides and realizes the transfer of optical power between the cores by utilizing the mode coupling of light between parallel waveguides.

When a part of the first waveguide core 111 and a part of the second waveguide core 121 overlap in the Z direction (perpendicular direction), as illustrated in FIG. 4, there are a case where parallel waveguides exist between the respective waveguides via the intermediate cladding layer 103 and a case where the respective waveguides are in complete contact with each other (described later as a second embodiment). In either case, it is possible to cause coupling between modes of light and to realize the transfer of optical power between the two waveguides.

In the inter-core light coupling section 141 of the optical connection element 100 according to the present embodiment, the first waveguide core in has a mode field diameter (MFD) converter in a tapered shape with its width gradually decreasing with respect to the traveling direction of the resin curing light 152. On the other hand, the second waveguide core 121 has an MFD converter in a tapered shape with its width gradually increasing with respect to the traveling direction of the resin curing light 152. As described above, since each of the first waveguide core 111 and the second waveguide core 121 has the MFD converter having the tapered shape in the inter-core light coupling section 141, the interaction between the two waveguides is strong, and it is possible to shorten the coupling length that is the propagation length until the optical power propagating through one waveguide is completely transferred between the waveguides.

Figure 5:
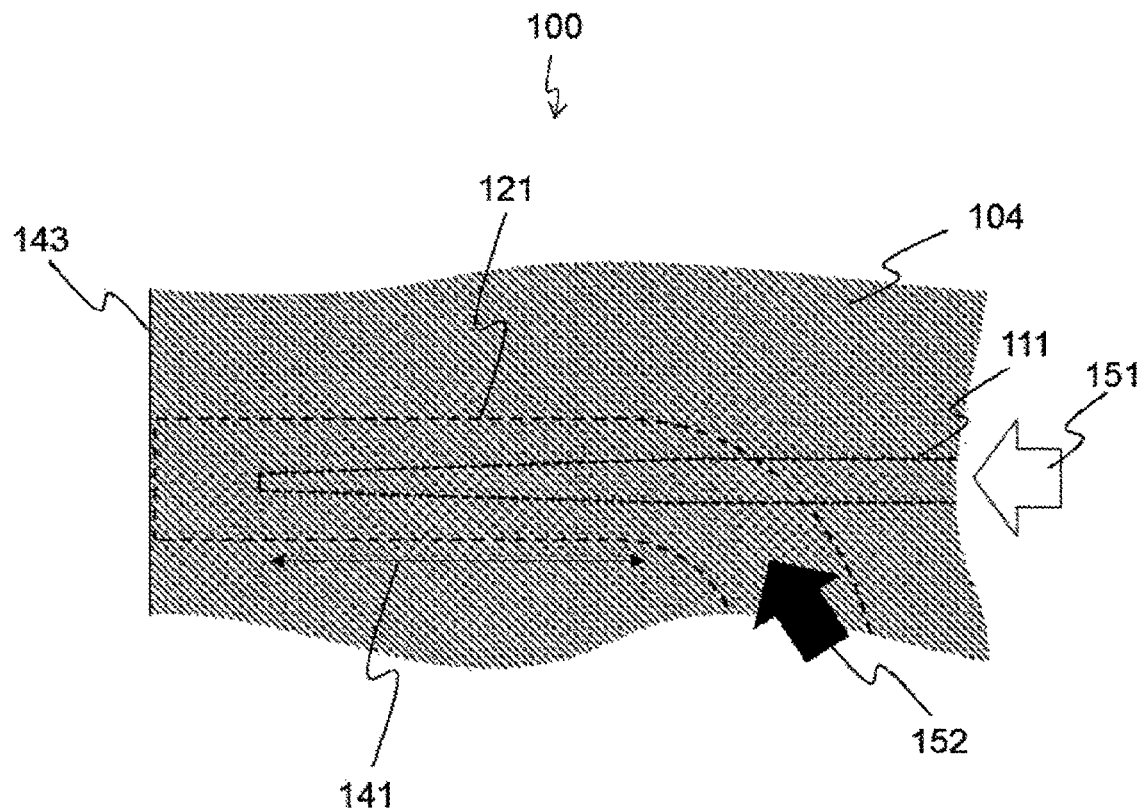
FIG. 5 is a top perspective view illustrating an example of the optical connection element according to the first embodiment of the present invention.

In the inter-core light coupling section 141, when either the first waveguide core 111 or the second waveguide core 121 has an MFD converter in a tapered shape as illustrated in FIG. 5, the same effect is obtained.

Here, it is sufficient that the widths of the first waveguide core 111 and the second waveguide core 121 be changed in a part of the inter-core light coupling section 141 even if not in the entire region.

The resin curing light coupling section 142 has a circuit structure for combining the signal light 151 and the resin curing light 152 in the second waveguide core 121 and can be formed of a waveguide continuous to the second waveguide end as illustrated in FIG. 1, for example.

The resin curing light coupling section 142 capable of coupling the resin curing light 152 to the second waveguide core 121 exists in the second waveguide core 121 and can be realized by, for example, a bent waveguide as illustrated in FIG. 1. The third waveguide core 131 having a core formed by an increase in refractive index through a photoreaction is in contact with the end edge of the second waveguide core 121 corresponding to the end face of the optical device.

The signal light 151 propagates through the first waveguide core 111 and transitions from the first waveguide core 111 to the second waveguide core 121 in the inter-core light coupling section 141.

The resin curing light 152 propagates through the second waveguide core 121 in the Y direction and is coupled to the second waveguide core 121 in the X direction by the bent waveguide in the resin curing light coupling section 142.

Here, an example is shown where the second waveguide core 121 joins from a direction perpendicular to the first waveguide core 111, but the second waveguide core 121 may join at a predetermined angle even if not in the perpendicular direction. It is sufficient that the resin curing light 152 propagating from a direction different from the propagation direction of the signal light 151 can be coupled to the second core waveguide overlapping the first core waveguide through which the signal light 151 propagates.

The width of the first waveguide core 111 changes from 500 nm at a base edge to 200 nm at the front edge (on the emission end face 143 side) in almost the region of the inter-core light coupling section 141. The distance from the front edge of the first waveguide core 111 to the emission end face 143 is about 100 μm. Here, the length of the inter-core light coupling section 141 is about 30 μm.

The width of the second waveguide core 121 changes from 300 nm at the base edge to 1 μm at the front edge (on the emission end face 143 side) in almost the region of the inter-core light coupling section 141. The curvature of the bent waveguide in the resin curing light coupling section 142 near the base edge of the second waveguide core 121 is about 10 μm.

The third waveguide core 131 and the third waveguide cladding 132 are made of an SWW material. The SWW material placed on the emission end face 143 is irradiated with the resin curing light 152 emitted from the emission end face 143, and the irradiated portion of the SWW material increases in refractive index to become the third waveguide core 131. Here, the width of the third waveguide core 131 is about 600 nm.

In regard to the materials that realize these structures, for example, the substrate 101 can be made of silicon (Si), the upper cladding layer 104, the intermediate cladding layer 103, and the lower cladding layer 102 can be made of silicon dioxide ($SiO_2$), the first waveguide core 111 can be made of Si, and the second waveguide core 121 can be made of silicon oxynitride (SiON). Photocurable resin is used as the SWW material for the third waveguide core 131 and the third waveguide cladding 132. Hereinafter, it is assumed that the materials described above are used. Here, silicon nitride ($Si_xN_y$) may be used for the second waveguide core 121.

Here, the thickness of the lower cladding layer 102 is 2 μm, the thickness of the first waveguide core 111 is 220 nm, the thickness of the second waveguide core 121 is 400 to 600 nm, and the thickness of the upper cladding layer 104 is 5 μm. The interval between the top surface of the first waveguide core 111 and the bottom surface of the second waveguide core 121 in the intermediate cladding layer 103 is about 100 nm.

Further, as illustrated in FIG. 2, the first waveguide core 111 is disposed substantially at the center with respect to the bottom surface of the second waveguide core 121 (with respect to the surface in contact with the lower cladding layer 102) in the cross-section with respect to the light guiding direction, but even if not disposed substantially at the center, it is sufficient that the first waveguide core 111 be disposed such that the signal light 151 exuding from the first waveguide core 111 can propagate through the second waveguide core 121 in a single mode.

Although silicon oxide ($SiO_2$, $SiO_x$), for example, is used for the upper cladding layer 104 and the lower cladding layer 102 of the present structure, other materials can also be applied so long as having a refractive index lower than that of the second waveguide core 121 and serving as the cladding layer.

The lower cladding layer 102 is not necessarily required, and for example, when the substrate 101 is silicon oxide, the first waveguide core 111 made of Si may be formed directly on the substrate 101.

For the substrate 101, Si can be used, and other materials such as sapphire and glass can also be used.

There are two reasons why optical connection by the SWW can be realized by the present structure. First, it is possible to use a material such as silicon nitride that is transparent in a visible light band to which the resin curing light 152 mainly belongs in addition to the signal light 151, that is, a material having a small propagation loss for visible light as compared to the material used for the first waveguide core 111.

Second, the signal light 151 propagating through the first waveguide can be coupled to the second waveguide made of silicon nitride, for example.

As described above, the resin curing light 152 and the signal light 151 can be emitted from the same waveguide end, and a condition for the optical connection by the SWW can be achieved.

Next, the principle of the optical connection by the SWW will be described. The condition for the optical connection by the SWW is that the resin curing light 152 is emitted from the end face of the waveguide from which the signal light 151 is emitted.

Figure 6:
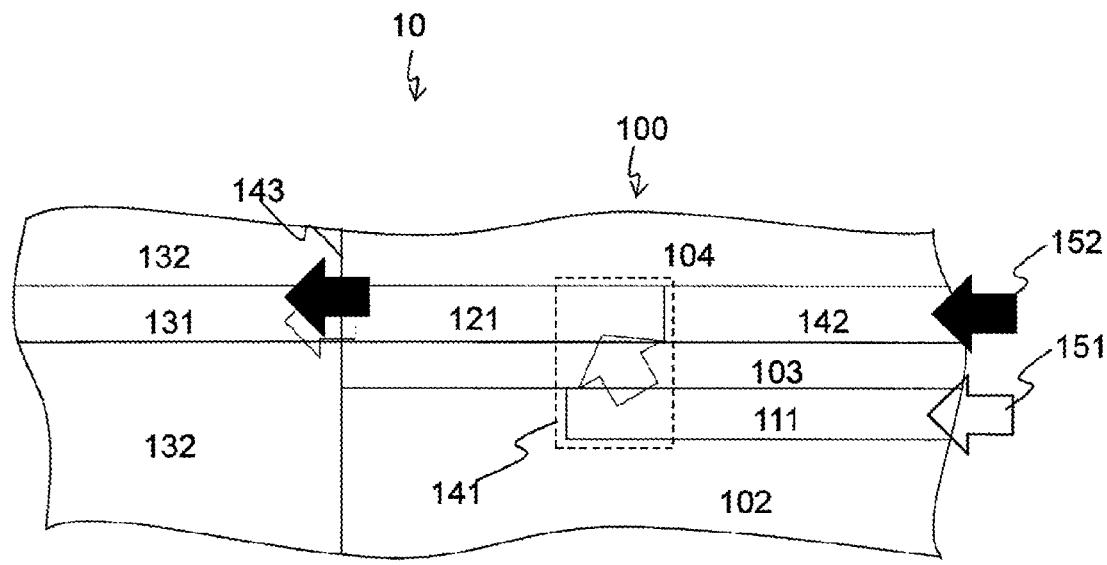
FIG. 6 is a cross-sectional view taken along line IV-IV for explaining propagation of signal light and resin curing light in the optical element including the optical connection element according to the first embodiment of the present invention.

FIG. 6 illustrates the propagation of the signal light 151 and the resin curing light 152. First, the signal light 151 mainly propagates through a first waveguide core 111 formed of a semiconductor material. Then, in the inter-core light coupling section 141, the signal light 151 transitions from the first waveguide core 111 to the second waveguide core 121. In this manner, the signal light 151 coupled to the second waveguide core 121 propagates through the second waveguide core 121 and reaches the end edge of the second waveguide core 121.

On the other hand, the resin curing light 152 mainly propagates only through the second waveguide core 121. As illustrated in FIG. 6, the resin curing light 152 is coupled to the second waveguide core 121 by the resin curing light coupling section 142. Then, after passing through the second waveguide core 121 which is a part of the inter-core light coupling section 141, the resin curing light 152 propagates through the second waveguide core 121 and reaches the end edge of the second waveguide core 121. As described above, the signal light 151 and the resin curing light 152 are emitted from the end edge of the second waveguide core 121, so that it is possible to achieve the optical connection condition by the SWW.

In the present embodiment, the interval between the first waveguide core 111 and the second waveguide core 121, that is, the interval between the top surface of the first waveguide core 111 and the bottom surface of the second waveguide core 121 in the intermediate cladding layer 103, is set to about 100 nm, but the present invention is not limited thereto. In general, the shorter the wavelength, the shorter the interval between parallel waveguides required for mode coupling, and hence the interval between the first waveguide core 111 and the second waveguide core 121 only needs to be reduced to a layer thickness, for example, 1.3 to 1.5 µm or less, with which the signal light 151 in a long-wavelength band is coupled sufficiently.

Figure 7:
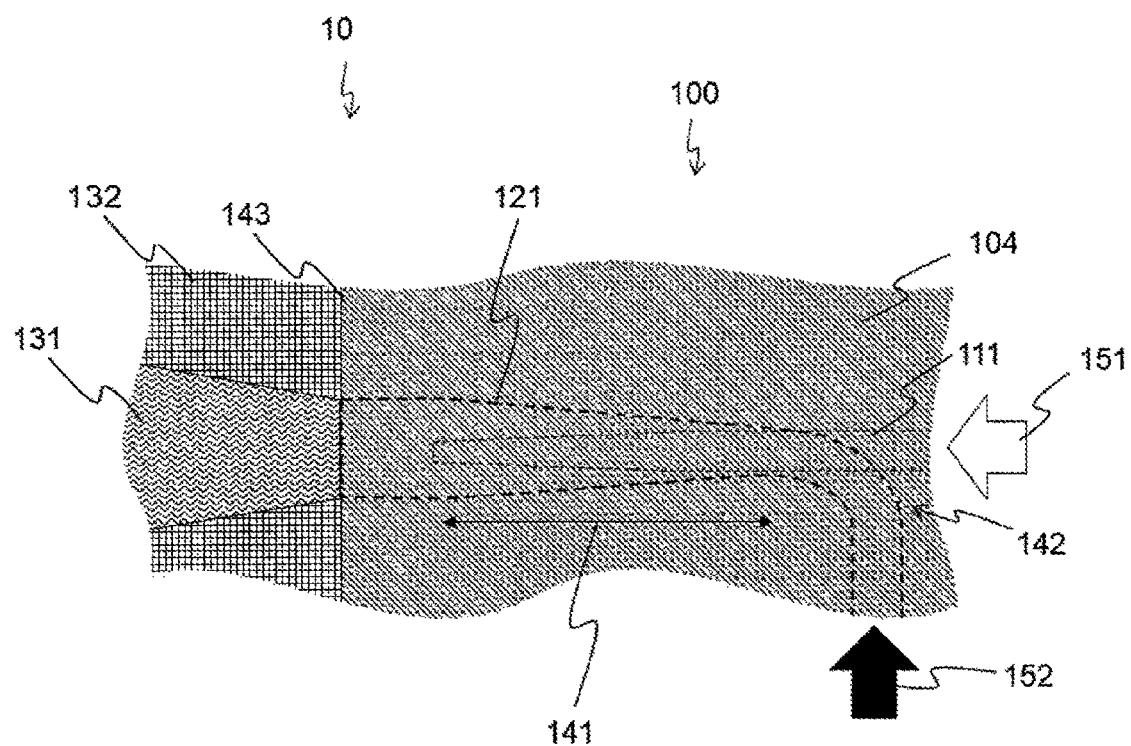
FIG. 7 is a top perspective view illustrating an example of the optical element that includes the optical connection element according to the first embodiment of the present invention.

Note that the shape of the SWW that is the third waveguide core 131 may be a waveguide shape having a substantially uniform diameter or a tapered shape. Therefore, in addition to the shape illustrated in FIG. 1, there are cases where the core has a tapered shape as illustrated in FIG. 7, but the present embodiment does not limit the shape of the core.

Further, in the optical connection by the SWW using the optical connection element 100 according to the present embodiment, a resin curing light incidence section 144 is necessary in the optical connection element 100 in order to make the resin curing light 152 incident on the inside the optical connection element 100 from the outside of the optical connection element 100 and propagate to the resin curing light coupling section 142. This is because in an ordinary optical communication device, a waveguide or an incidence section for the resin curing light 152 is not integrated because the resin curing light 152 is not propagated.

Figure 8:
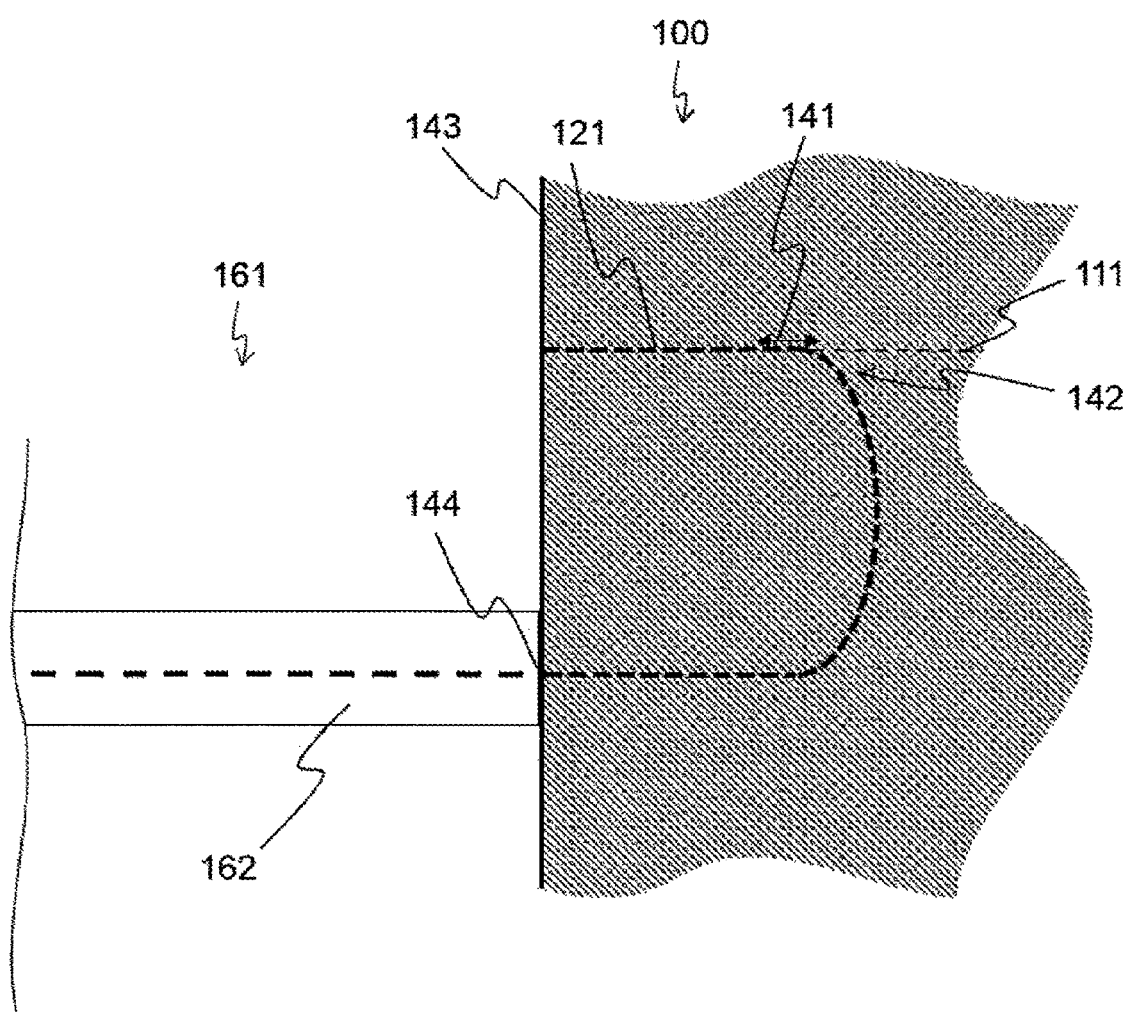
FIG. 8 is a view illustrating an example of a method of making the resin curing light incident in the optical connection element according to the first embodiment of the present invention.

FIG. 8 illustrates a configuration in which the resin curing light 152 is made incident on the optical connection element 100. In the present configuration, the resin curing light incidence section 144 is provided for propagating the resin curing light 152 to the resin curing light coupling section 142, an optical fiber 161 is aligned by the resin curing light incidence section 144 at the emission end face 143 of the optical connection element 100, and the resin curing light 152 is made incident on the second waveguide core 121 from the resin curing light incidence section 144, whereby it is possible to realize the emission of the resin curing light 152 from the end face, from which the signal light 151 is emitted. Here, the optical fiber 161 has an optical fiber core 162.

In order to realize the present embodiment, the loss of the light incident on the second waveguide core 121 until the emission of the light may be very large compared to that of an ordinary optical device. This is because the optical power of the resin curing light 152 required for forming the SWW is low. For example, the power of the resin curing light 152, required to form the SWW at a minimum and emitted from the end face of the second waveguide core 121, is about −40 dBm.

On the other hand, the maximum power of a commercially available light source that can be used as the resin curing light 152 of the SWW is about 40 dBm, which is very high compared to the optical power required for curing.

From the above, the SWW can be formed when the loss of the incident resin curing light 152 generated after the incidence of the light on the second waveguide core 121 until the emission of the light from the end face of the second waveguide core 121 that forms the SWW is 80 dB or less.

First Modification of First Embodiment

In the first embodiment illustrated in FIG. 2, the resin curing light coupling section 142 has been provided in the waveguide from the incidence section of the resin curing light to the point of arrival of the propagating light at the third waveguide core 131, but the resin curing light coupling section 142 may be provided in the waveguide from the inter-core light coupling section 141 to the point of arrival of the propagating light at the third waveguide core.

Figure 9:
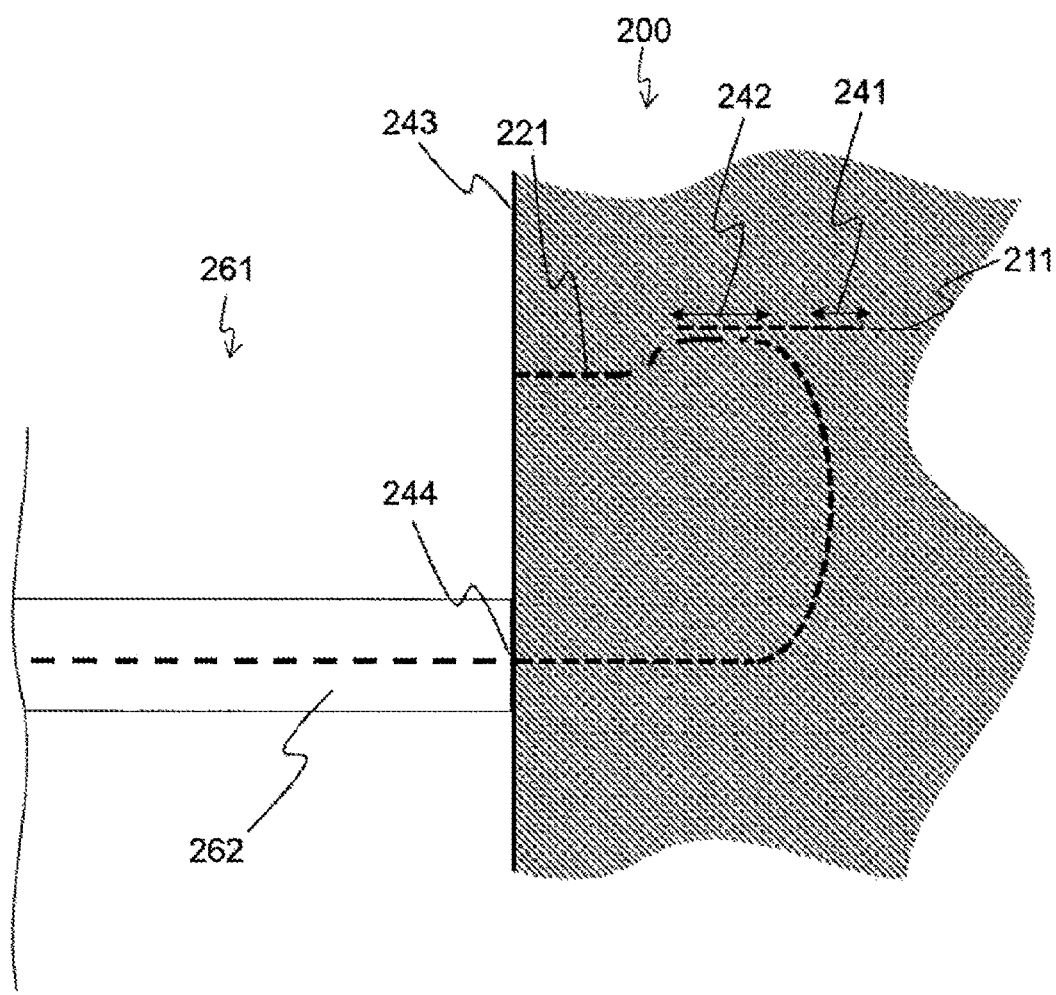
FIG. 9 is a top perspective view of an optical connection element according to a modification of the first embodiment of the present invention.

FIG. 9 illustrates an optical connection element 200. The optical connection element 200 is provided with a directional coupler made up of one waveguide including a first waveguide core 211 and a second waveguide core 221 and the other waveguide including the second waveguide core 221.

After propagating through the first waveguide core 211 in the one waveguide, the signal light is coupled to the second waveguide core 221 in an inter-core light coupling section 241, is coupled to the other waveguide in a resin curing light coupling section 242, and propagates to reach an emission end face 243. Meanwhile, the resin curing light propagates through the other waveguide and reaches the emission end face 243.

As described above, even in the configuration where the resin curing light coupling section 242 is provided in the waveguide from the inter-core light coupling section 241 to the point of arrival of the propagating light at a third waveguide core (not illustrated), the resin curing light and the signal light can be combined in the second waveguide core 221, and hence the optical connection by the SWW can be performed.

Second Modification of First Embodiment

Figure 10:
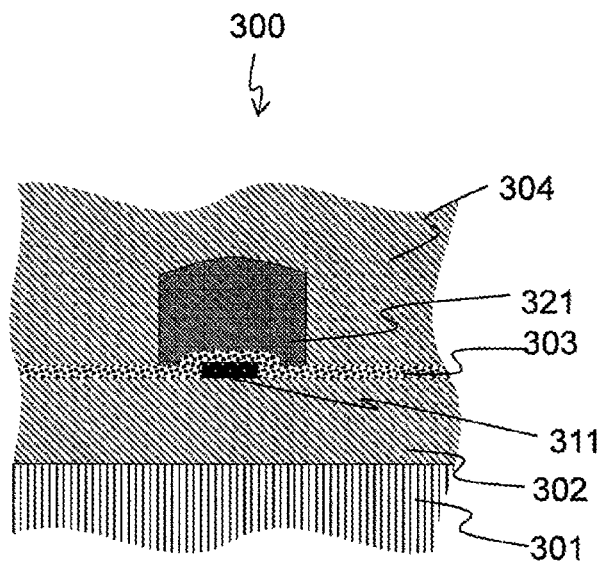
FIG. 10 is a cross-sectional view of an optical connection element according to a modification of the first embodiment of the present invention.

FIG. 10 is a cross-sectional view (corresponding to a sectional view taken along line II-II' in FIG. 1) in a case where the thickness of an intermediate cladding layer 303 in an optical connection element 300 is smaller than the thickness of a first waveguide core 311. The cross-sectional shape of a second waveguide core 321 is convex upward by the thickness of the first waveguide core 311.

As thus described, the cross-sectional shape of the second waveguide core 321 may change slightly. However, light can be propagated with sufficiently low loss with only a slight change, and the optical connection element 300 according to the present embodiment can be realized regardless of the core shape of the second waveguide core 321.

Third Modification of First Embodiment

Figure 11:
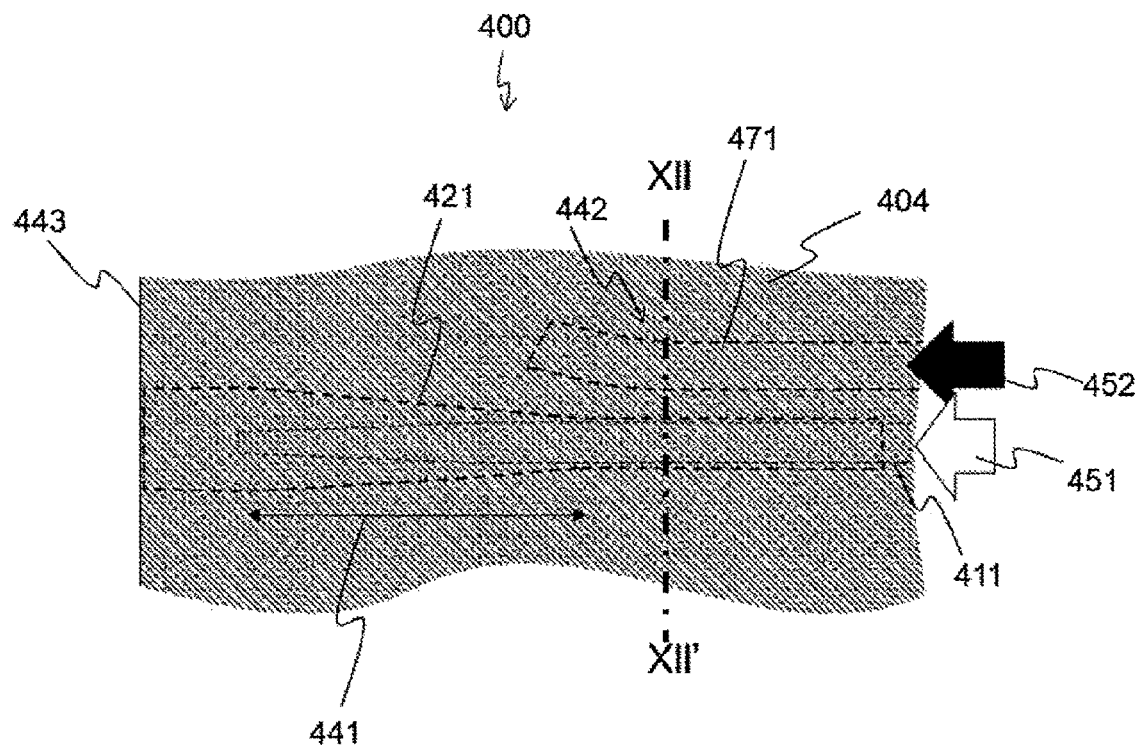
FIG. 11 is a top perspective view of an optical connection element according to a modification of the first embodiment of the present invention.
Figure 12:
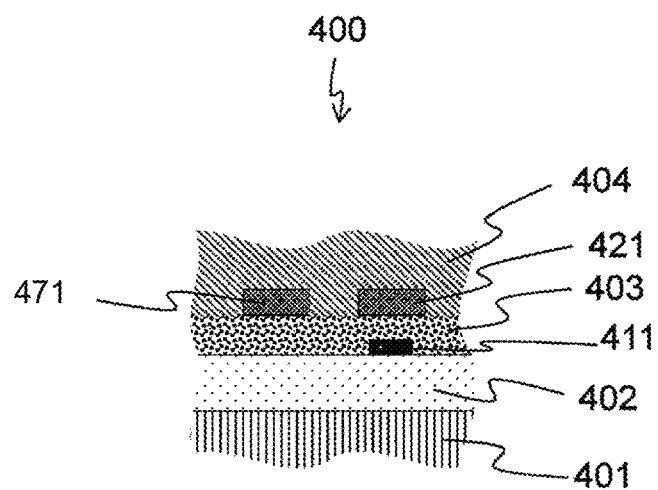
FIG. 12 is a cross-sectional view taken along line XII-XII' of the optical connection element according to the modification of the first embodiment of the present invention.

The resin curing light coupling section may have various structures. FIG. 11 is a top perspective view of an optical connection element 400, and FIG. 12 is a cross-sectional view taken along line XII-XII' in FIG. 11. A resin curing light coupling section 442 can be realized by a directional coupler including a parallel second waveguide core 421 illustrated in FIG. 11.

In the optical connection element 400, in the directional coupler including the second waveguide core 421 and a waveguide 471 disposed in parallel, resin curing light 452 propagating through the waveguide 471 is optically coupled and propagates through the second waveguide core 421. In this case, the coupling length between the second waveguide core 421 and the waveguide 471 can be set in consideration of the coupling efficiency and wavelength of the resin curing light 452.

Figure 13:
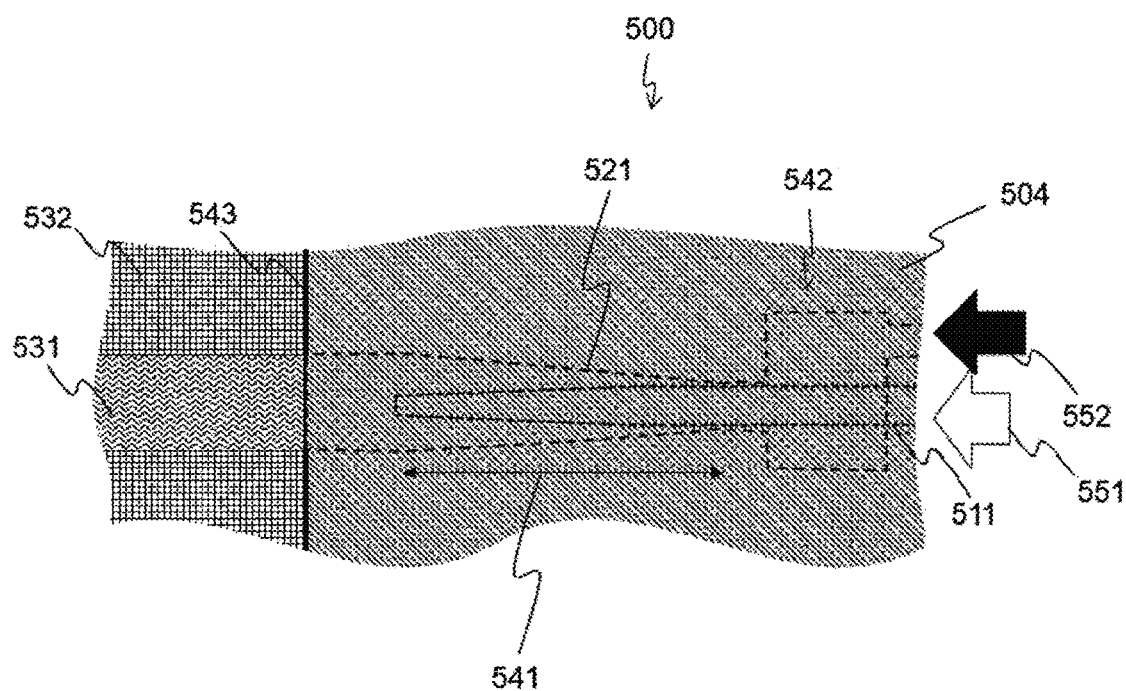
FIG. 13 is a top perspective view of an optical element including the optical connection element according to the modification of the first embodiment of the present invention.

In addition, as in an optical connection element 500 illustrated in FIG. 13, a resin curing light coupling section 542 may be realized by a structure such as a multimode interference optical waveguide. In this case, the size of the resin curing light coupling section 542 can be made small compared to the case of using the structure illustrated in FIG. 11.

Figure 14:
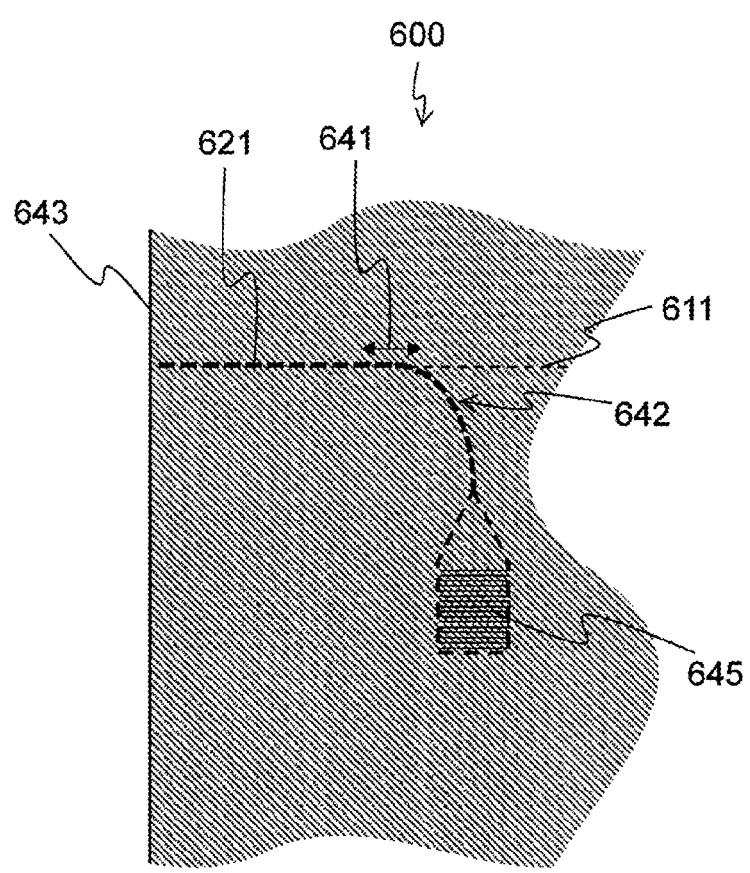
FIG. 14 is a top perspective view of the optical connection element according to the modification of the first embodiment of the present invention.

Further, another configuration example is conceivable for the resin curing light incidence section. For example, as in an optical connection element 600 illustrated in FIG. 14, light incident on a resin curing light input unit 645 is propagated using a diffraction grating coupler, and a resin curing light coupling section 642 can be realized. As thus described, the resin curing light may be made incident in a direction from a top surface direction of the optical connection element 600. In this case, since the light can be made incident from the top surface of the element, the entire circuit element can be made small compared to a case where a waveguide for incidence needs to be formed up to the end face of the element (e.g., FIG. 8).

As described above, in the present embodiment, the signal light and the resin curing light can be propagated to the first waveguide core and the second waveguide core of the optical connection element 100. The signal light mainly propagates through the first waveguide core, exudes into the second waveguide core in the inter-core light coupling section 112, propagates through the second waveguide core, and is emitted from the emission end face.

On the other hand, the resin curing light is used at the time of forming the SWW that is the third waveguide core 131, and the light is coupled to the second waveguide core mainly in the resin curing light coupling section, propagates, and is emitted from the emission end face. When the emission end face, more specifically, the SWW material placed on the end face of the second waveguide core, is irradiated with the resin curing light, the refractive index of the irradiated portion increases, and the third waveguide core 131 is formed.

<Method for Manufacturing Optical Element Using Optical Connection Element>

In a method for manufacturing an optical element that optically connects the third waveguide core 131 and the third waveguide cladding 132 to the optical connection element 100 of the present embodiment, as described above, the optical connection process by the SWW mainly has three steps of dropping resin, emitting resin curing light to form an SWW, and forming a cladding layer.

As an example of the method for manufacturing the present element, more specifically, the optical connection element 100 of the present embodiment is produced in the first place. First, a material of the lower cladding layer 102, such as silicon oxide, and a material of the first waveguide core, such as Si, are laminated on the substrate 101.

Next, Si is processed into a first waveguide core by using conventional photolithography.

Subsequently, a material of the intermediate cladding layer 103, such as silicon oxide, and a material of the second waveguide core 121, such as SiON, are laminated on the first waveguide core. Here, SiON can be formed by adding nitrogen during formation of a silicon oxide film.

Then, SiON is processed into a second waveguide core by using conventional photolithography.

Finally, the upper cladding layer 104 is formed on the second waveguide core so as to cover the second waveguide core by using, for example, silicon oxide as a material.

Next, an optical element is produced in the process of the optical connection by the SWW. First, a material of the SWW, such as photocurable resin, is dropped (placed) onto the end face of the second waveguide core of the optical connection element 100.

Next, resin curing light is propagated to the second waveguide core.

Subsequently, the photocurable resin is irradiated with the resin curing light and photo-cured to form the third waveguide core 131.

Then, a portion of the photocurable resin, having not been irradiated with the resin curing light and not been cured, is removed by washing or the like.

Finally, the resin is dropped (placed) around the photo-cured photocurable resin to form the third waveguide cladding 132.

Here, as the material of the third waveguide core 131, a solid SWW material can also be used. In this case, first, the SWW material is fixed to the end face of the second waveguide core with an adhesive or the like, and then the end face is irradiated with the resin curing light. As a result, the irradiated portion becomes the third waveguide core 131, and the non-irradiated portion becomes the cladding 132. In this case, it is not necessary to remove the portion that has not been photo-cured or to drop (place) the resin for cladding.

As described above, according to the method for manufacturing an optical element according to the present embodiment, it is possible to make low-loss optical connection of optical elements made of various materials without requiring highly accurate positioning.

Second Embodiment

A second embodiment of the present invention will be described. An optical element 70 and an optical connection element 700 according to the present embodiment have the same configurations, actions and effects as those of the optical element 10 and the optical connection element 100 according to the first embodiment except for the presence or absence of the intermediate cladding layer.

Figure 15:
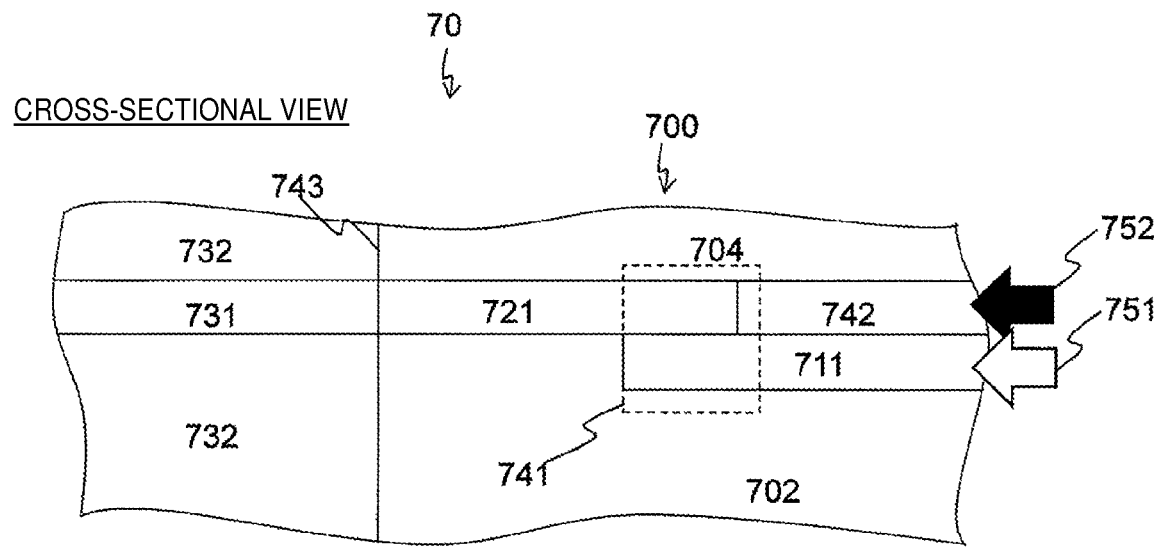
FIG. 15 is a cross-sectional view of an optical element including an optical connection element according to a second embodiment of the present invention.

FIG. 15 illustrates a cross-sectional view (corresponding to a cross-sectional view taken along line III-III' in FIG. 1) of the optical connection element 700 according to the present embodiment. The optical connection element 700 does not have an intermediate cladding layer but has a structure in which a first waveguide core 711 and a second waveguide core 721 are in contact with each other. In the case of this structure, the first waveguide core 711 and the second waveguide core 721 are physically close to each other, and the interaction of light in an inter-core light coupling section 741 is strong. This shortens the coupling length required for inter-core coupling, and hence the circuit element can be made small.

However, since optical coupling between the two waveguide cores 711 and 721 is more likely to occur, crosstalk, which is unnecessary mode coupling of signal light 751, is likely to occur between the first waveguide core 711 and the second waveguide core 721. The crosstalk can be suppressed by reducing a region in which the first waveguide core 711 and the second waveguide core 721 overlap in the perpendicular direction, that is, the inter-core light coupling section 741.

It is thus necessary to optimize the design of the inter-core light coupling section 741 in consideration of the optical interaction and crosstalk described above.

As thus described, the optical connection element 700 according to the present embodiment does not have an intermediate cladding layer but has a configuration in which a part of the first waveguide core 711 and a part of a second waveguide core 712 overlap in the perpendicular direction. With this configuration, the signal light 751 can be propagated to the first waveguide core 711, coupled to the second waveguide core 721 in the inter-core light coupling section 741, propagated to the second waveguide core 721, and emitted from an emission end face 743. Further, resin curing light 752 can be coupled to the second waveguide core 721 in a resin curing light coupling section 742, propagated to the second waveguide core 721, and emitted from the emission end face 743.

Third Embodiment

A third embodiment of the present invention will be described.
<Configuration of Optical Connection Element>

Figure 16:
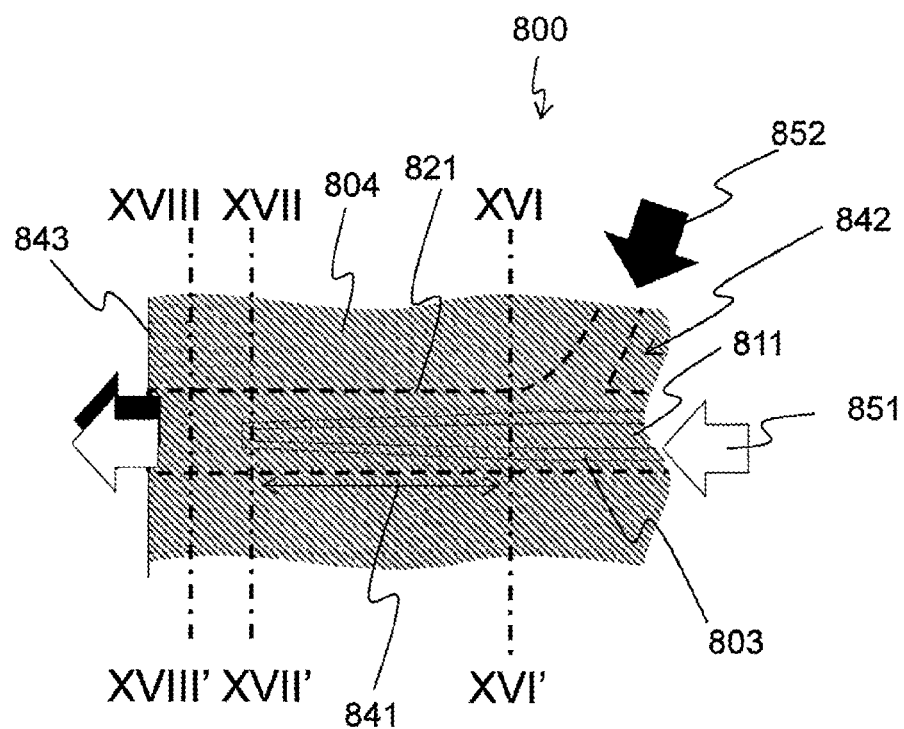
FIG. 16 is a top perspective view of an optical connection element according to a third embodiment of the present invention.
Figure 17:
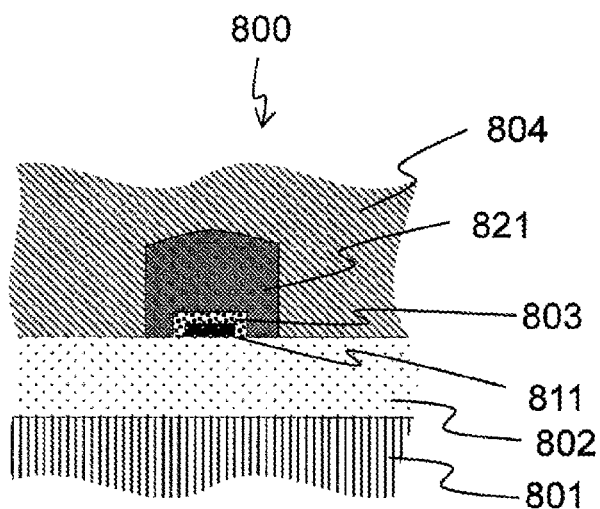
FIG. 17 is a cross-sectional view taken along line XVI-XVI' of the optical connection element according to the third embodiment of the present invention.

FIG. 16 is a top perspective view of an optical connection element 80 according to the third embodiment. FIG. 17 is a cross-sectional view taken along line XVI-XVI' in FIG. 16, FIG. 18 is a cross-sectional view taken along line XVII-XVII' in FIG. 16, and FIG. 19 is a cross-sectional view taken along line XVIII-XVIII' in FIG. 16.

As illustrated in FIG. 17, an inter-core light coupling section having a first waveguide core 811 in the optical connection element 800 has a structure in which an intermediate cladding layer 803 covers the surface except for the bottom surface of the first waveguide core 811 on the lower cladding layer 802 (the boundary surface with a lower cladding layer 802) in a convex shape from above, and a second waveguide core 821 covers the surface except for the bottom surface of the intermediate cladding layer 803 (the boundary surface with the lower cladding layer 802 and the first waveguide core 811) in a convex shape from above. As described above, the optical connection element 800 has the inter-core light coupling section in which a part of the first waveguide core and a part of the second waveguide core overlap in the perpendicular direction.

Figure 18:
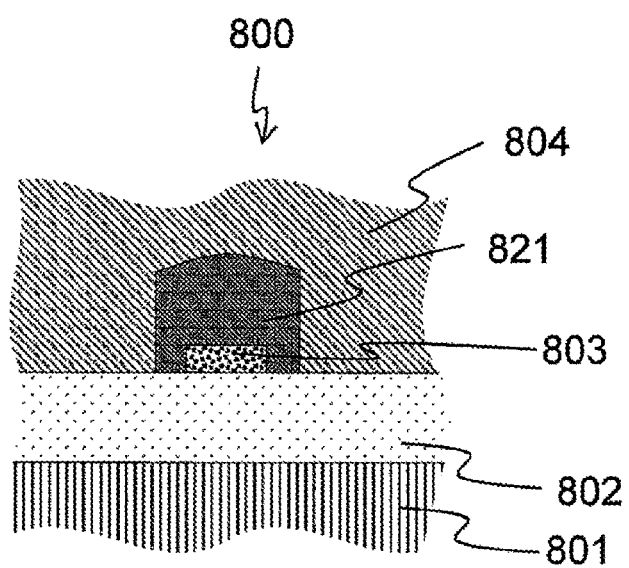
FIG. 18 is a cross-sectional view taken along line XVII-XVII' of the optical connection element according to the third embodiment of the present invention.

As illustrated in FIG. 18, a region between the front edge of the first waveguide core 811 and the front edge of the intermediate cladding layer 803 in the optical connection element 800 does not have the first waveguide core 811 but has a structure in which the second waveguide core 821 covers the intermediate cladding layer 803 on the lower cladding layer 802 in a convex shape from above.

Figure 19:
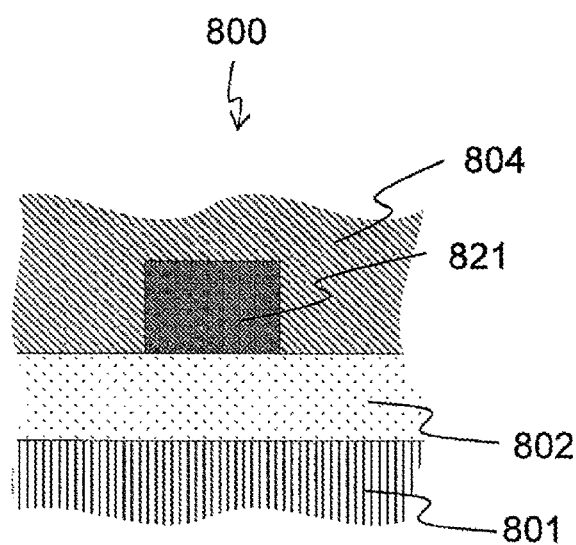
FIG. 19 is a cross-sectional view taken along line XVIII-XVIII' of the optical connection element according to the third embodiment of the present invention.

As illustrated in FIG. 19, a region from the front edge of the intermediate cladding layer 803 to the emission end face thereof in the optical connection element 800 has a structure in which the second waveguide core 821 covers the lower cladding layer 802.
<Method for Manufacturing Optical Connection Element and Optical Element>

The optical connection element 800 according to the present embodiment can be produced by introducing a step of performing thermal oxidation treatment in an oxygen atmosphere on the first waveguide core 811 made of silicon and formed on the lower cladding layer 802 made of a silicon oxide film in the method for manufacturing the optical connection element 100 according to the first embodiment. By this step, the intermediate cladding layer 803, made of a silicon oxide film (silicon oxide) and covering the first waveguide core 811 made of silicon, is formed.

Thereafter, as in the method for manufacturing the optical connection element according to the first embodiment, the present structure can be formed by forming a film of a material to be the second waveguide core 821 and processing the film as the waveguide.

With the structure of the optical connection element 800 according to the present embodiment, as compared to the first and second embodiments, the surface of the first waveguide core 811 can be protected during the process of forming the film of the second waveguide core 821. Specifically, in a structure in which the first waveguide core 811 and the second waveguide core 821 are in contact with each other, when Si is used as the first waveguide core 811 and SiON formed by adding nitrogen during the formation of the silicon oxide film is used as the second waveguide core 821, there is a concern that the surface of the Si waveguide reacts with nitrogen during the formation of the SiON film to become a nitride (including Silicon oxynitride (SiOxNy)), thereby causing a change in the optical properties of the waveguide. Therefore, with the structure of the optical connection element 800 according to the present embodiment, the layer (intermediate cladding layer 803) for protecting the first waveguide core 811 made of Si is formed, so that it is possible to prevent a deterioration in the surface of the first waveguide core 811 made of Si.

Also, in the optical connection element 800 according to the present embodiment, as in the first and second embodiments, a resin curing light coupling section 842 can be realized by the configuration of the waveguide illustrated in FIG. 16, and signal light 851 and resin curing light 852 can be emitted from an emission end face 843 of the second waveguide core 821 to form an SWW.

Figure 20:
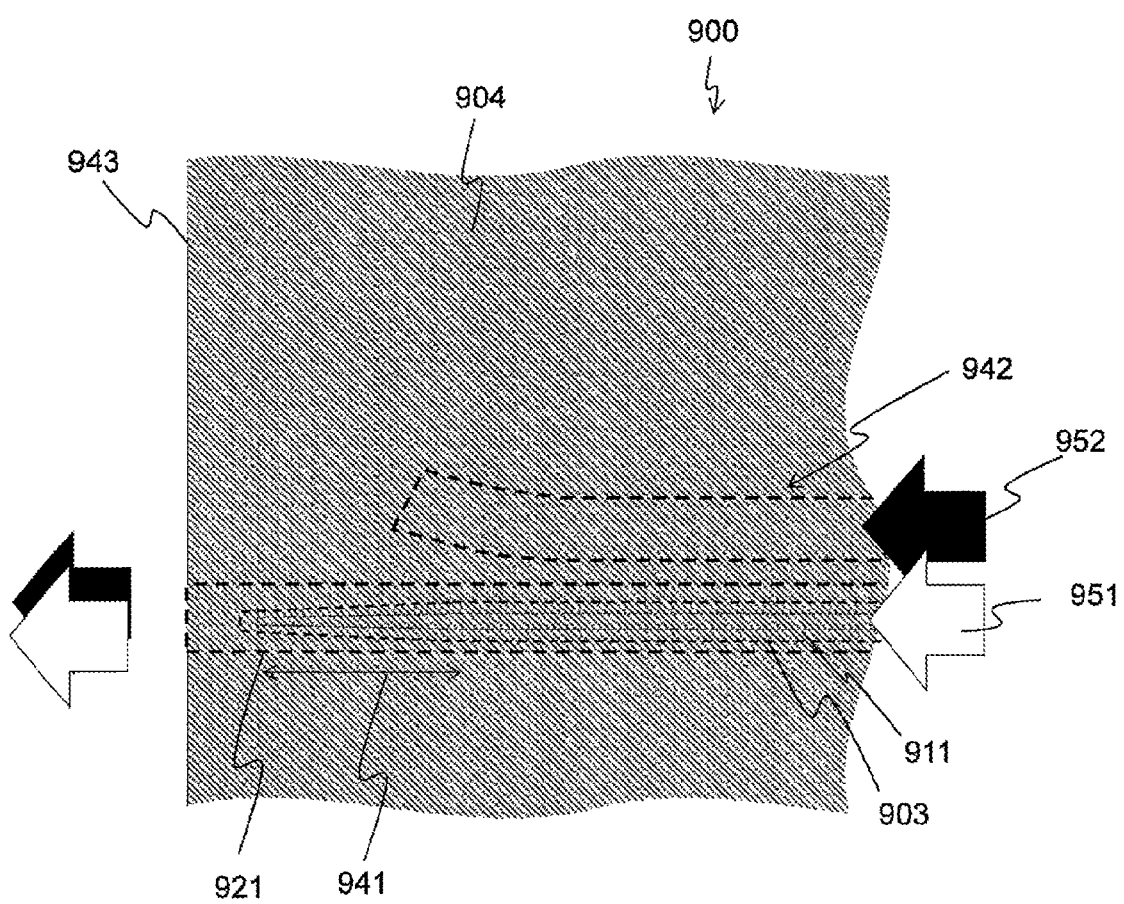
FIG. 20 is a top perspective view illustrating an example of the optical connection element according to the third embodiment of the present invention.
Figure 21:
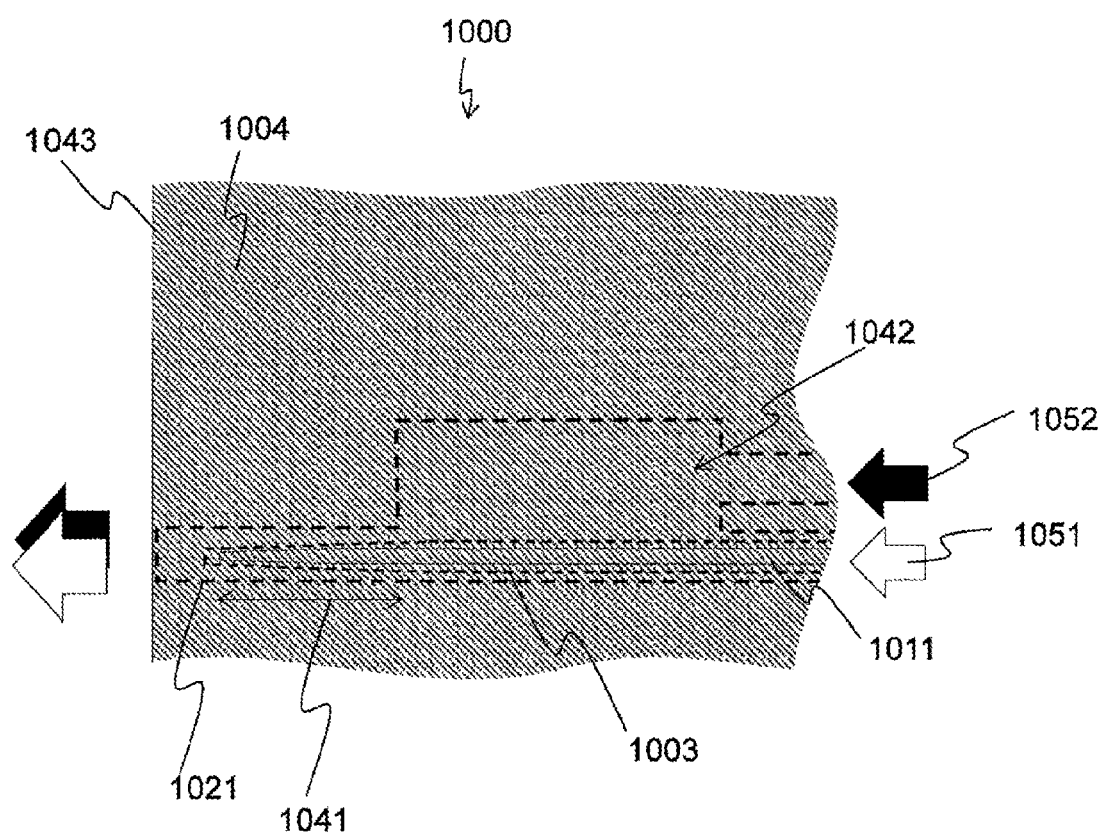
FIG. 21 is a top perspective view illustrating an example of the optical connection element according to the third embodiment of the present invention.

In addition, a resin curing light coupling section 942 can be also realized by a structure utilizing mode coupling between parallel waveguides in an optical connection element 900 illustrated in FIG. 20, and a resin curing light coupling section 1042 can also be realized by a structure having the form of a multimode interference optical waveguide in an optical connection element 1000 illustrated in FIG. 21, and the SWW can be formed. In the former case, it is possible to control the coupling efficiency and wavelength of resin curing light 952 by controlling the coupling length of the directional coupler. In the latter case, it is possible to reduce the size of the resin curing light coupling section 1042.

Fourth Embodiment

A fourth embodiment of the present invention will be described with reference to FIG. 22. In an optical connection element 1100 according to the present embodiment, with respect to a single input unit 1144 for resin curing light 1152, a circuit structure is utilized to divide the resin curing light 1152, whereby the resin curing light 1152 can be simultaneously emitted from each of emission end faces 11431, 11432 of a plurality of second waveguide cores 1121, and the SWW can be formed at each of the emission end faces 11431, 11432 of the respective waveguides.

Details will be described below. First, the resin curing light 1152 input from the optical fiber 1161 is branched by a branch structure 1146.

One light branched is coupled to the second waveguide core 1121 by, for example, a resin curing light coupling section 1142 using the bent waveguide shown in the first embodiment, propagates in the X− direction (illustrated in FIG. 22), and is emitted from the first emission end face 11431.

Meanwhile, the other light passes through the branch structure 1146, then propagates through the waveguide in the Y+ direction (illustrated in FIG. 20), is similarly coupled to the second waveguide core 1121 by the resin curing light coupling section 1142 using the bent waveguide, propagates in the X− direction (illustrated in FIG. 20), and is emitted from the second emission end face 11432.

As described above, the resin curing light can be emitted from each of the two emission end faces simultaneously, so that each of two waveguide connection units can be connected simultaneously by the SWW.

Figure 22:
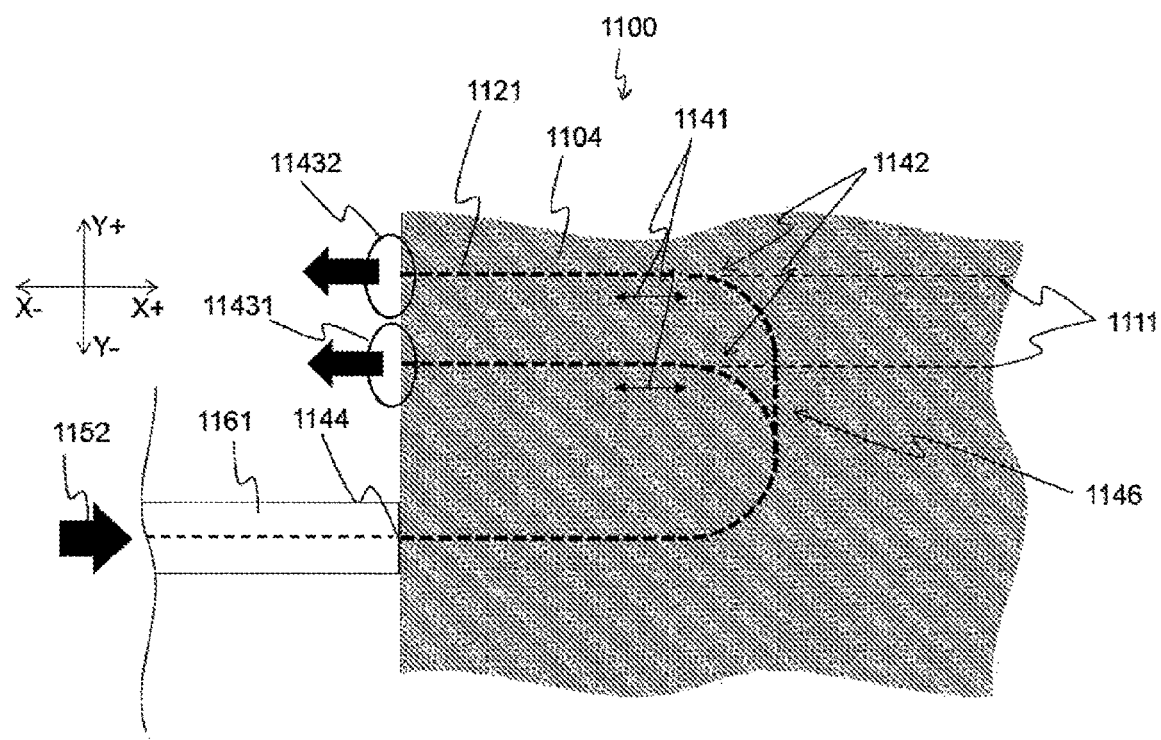
FIG. 22 is a top perspective view of an optical connection element according to a fourth embodiment of the present invention.
Figure 23:
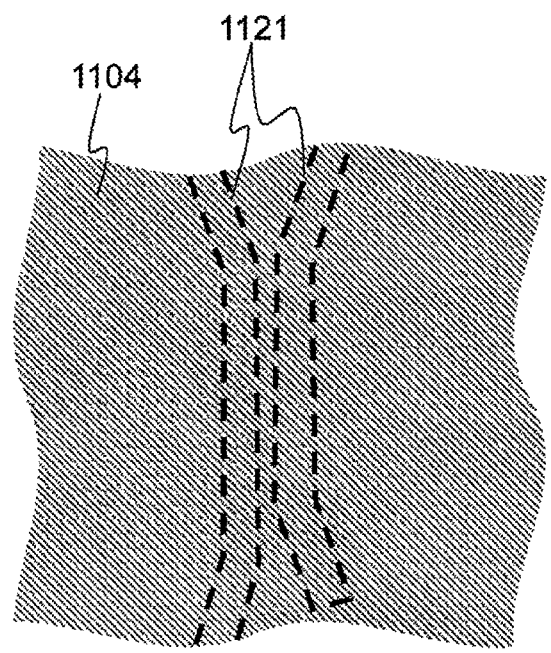
FIG. 23 is a top perspective view illustrating an example of a branch section of the optical connection element according to the fourth embodiment of the present invention.
Figure 24:
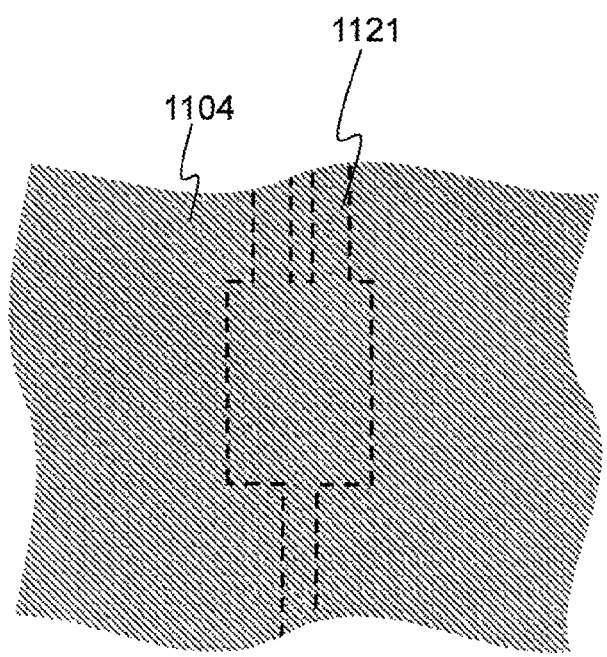
FIG. 24 is a top perspective view illustrating an example of the branch section of the optical connection element according to the fourth embodiment of the present invention.

As the structure for realizing the branch section, in addition to the Y-branch structure illustrated in FIG. 22, the structure formed of the directional coupler illustrated in FIG. 23 or the structure formed of the multimode interference optical waveguide illustrated in FIG. 24 can also be used to realize the same effect as that of the present embodiment. Further, in the former case, it is possible to control the coupling efficiency and wavelength of resin curing light by controlling the coupling length of the directional coupler. In the latter case, it is possible to reduce the size of the resin curing light coupling section.

In the present embodiment, the SWW has been formed on each of the two waveguide end faces, but it is also possible to emit the resin curing light from each of two or more waveguide end faces at the same time and form the SWW by combining a plurality of branch structures or increasing the number of branches. As a result, more waveguides can be connected simultaneously.

In the embodiment of the present invention, the inter-core light coupling section has a plurality of patterns depending on the presence or absence of the intermediate cladding layer 803 and the presence or absence of the MFD converter at the end of each of the parallel waveguides.

Although the waveguide structure formed of two waveguide cores, which are the first waveguide core and the second waveguide core, has been used in the embodiment of the present invention, the number of waveguide cores is not limited to two, but a plurality of waveguide cores having different refractive indices may be used. In this case, it is sufficient that the signal light and the resin curing light can be guided and emitted from the end face (emission end) of the element forming the SWW.

Although the liquid photocurable resin has been used as the SWW material in the embodiment of the present invention, the present invention is not limited thereto, but any material having a refractive index irreversibly increased by light irradiation may be used.

In the embodiment of the present invention, the wavelength of the resin curing light, at which the SWW core unit as the third waveguide core can be formed, may be 405 nm, for example. Light with other wavelengths can be used for forming the SWW core unit, and depending on the SWW material, light with a wavelength of 550 nm or less including 480 nm or light with a wavelength of 400 nm or less including 385 nm can be used. As described above, it is possible to form the SWW in the optical connection element by using various kinds of SWW materials and wavelengths of the resin curing light, and the present invention does not limit the kind of SWW material or the wavelength of the resin curing light.

In the embodiment of the present invention, a mirror, a grating coupler, a diffraction grating, or the like can also be used as a mechanism that not only allows the resin curing light to enter from the end face of the optical connection element by using an optical fiber or an optical waveguide and propagate through the second waveguide core, but also allows the resin curing light to enter from above the optical connection element and propagate through the second waveguide core.

Although the dimensions of the constituents, the components, and the like of the optical connection element, the optical element using the optical connection element, and the method for manufacturing the optical element according to each of the first to fourth embodiments of the present invention have been described, the dimensions are not limited thereto but only need to be dimensions in which the constituents, the components, and the like function.

In particular, the waveguide structure of the first waveguide core, the second waveguide core, or the like only needs to be formed such that the signal light can propagate in a single mode, and the resin curing light can be output at a light intensity to the extent that the SWW can be formed.

The optical connection element and the optical element using the optical connection element according to each of the second and fourth embodiments of the present invention can be manufactured by a method substantially the same as the manufacturing method shown in the first embodiment.

Note that the present invention is not limited to the embodiments described above, and it is obvious that various modifications and combinations can be implemented by a person skilled in the art within the technical concept of the present invention. For example, various combinations of materials are conceivable for the first waveguide core, the second waveguide core, and the third waveguide core.

Specific examples thereof include: a dielectric and resin in addition to semiconductors such as indium phosphide (InP) and gallium arsenide (GaAs) for the first waveguide core; and a resin material and a semiconductor in addition to a dielectric and quartz materials such as an oxide like SiOx and a nitride like SixNy other than SiON for the second waveguide core. Here, the present structure does not limit the materials so long as the first waveguide core has a higher refractive index than that of the second waveguide core 121, and the second waveguide core 121 has a higher refractive index than that of the upper cladding layer 104.

For the third waveguide core, the optical connection by the SWW using a crystal material can be realized because a light-induced increase in refractive index in the crystal has been reported.

The configuration of the resin curing light coupling section, the resin curing light incidence section, and the like in each of the embodiments of the present invention can be realized by various structures and combinations and is not limited to the embodiments described above, and it is obvious that many modifications and combinations can be implemented by a person ordinarily skilled in the art within the technical concept of the present invention.

INDUSTRIAL APPLICABILITY

The present invention relates to an optical connection element for connecting an optical element, an optical element using the optical connection element, and a method for manufacturing the optical element and can be applied to equipment and systems such as optical communications.

REFERENCE SIGNS LIST

100 Optical connection element
101 Substrate

102 Lower cladding layer
103 Intermediate cladding layer
104 Upper cladding layer
111 First waveguide core
112 Inter-core light coupling section
121 Second waveguide core
131 Third waveguide core
132 Third waveguide cladding
141 Inter-core light coupling section
142 Resin curing light coupling section
151 Signal light
152 Resin curing light.

The invention claimed is:

1. An optical connection element comprising:
a first waveguide core and a second waveguide core above a substrate or cladding, wherein the first waveguide core is configured to have a signal light propagate through the first waveguide core, and the second waveguide core is configured to have the signal light and a resin curing light propagate through the second waveguide core;
an inter-core light coupling section in which a part of the first waveguide core and a part of the second waveguide core overlap in a perpendicular direction;
an intermediate cladding layer is disposed between the first waveguide core and the second waveguide core; and
a resin curing light coupling section configured to couple the resin curing light to the second waveguide core.

2. The optical connection element according to claim 1, wherein a width of the first waveguide core decreases with respect to a traveling direction of the resin curing light.

3. The optical connection element according to claim 1 further comprising an emission end face from which the signal light and the resin curing light are configured to be emitted.

4. An optical connection element comprising:
a first waveguide core and a second waveguide core above a substrate or cladding, wherein the first waveguide core is configured to have a signal light propagate through the first waveguide core, and the second waveguide core is configured to have the signal light and a resin curing light propagate through the second waveguide core;
an inter-core light coupling section in which a part of the first waveguide core and a part of the second waveguide core overlap in a perpendicular direction;
an intermediate cladding layer disposed between the first waveguide core and the second waveguide core; and
a resin curing light coupling section configured to couple the resin curing light to the second waveguide core, wherein the optical connection element connects a self-written waveguide to an emission end face from which the signal light and the resin curing light are configured to be emitted, and wherein a refractive index of the self-written waveguide is configured to be irreversibly increased by the resin curing light emitted from the emission end face.

5. The optical connection element according to claim 4, wherein the self-written waveguide is formed of photocurable resin.

6. The optical connection element according to claim 4, wherein a width of the first waveguide core decreases with respect to a traveling direction of the resin curing light.

7. A method for manufacturing an optical element including an optical connection element that has a first waveguide core, a second waveguide core, an intermediate cladding layer, and an upper cladding layer above a substrate or a lower cladding section and in which signal light and resin curing light propagate through the second waveguide core and the signal light propagates through the first waveguide core, and a self-written waveguide connected to an end face of the second waveguide core, the method comprising:
forming the first waveguide core on the substrate or the lower cladding section;
forming the intermediate cladding layer on the first waveguide core;
forming the second waveguide core on the intermediate cladding layer such that a part of the first waveguide core and a part of the second waveguide core overlap in a perpendicular direction;
forming the upper cladding layer on the second waveguide core;
placing a material of the self-written waveguide on the end face of the second waveguide core;
propagating the resin curing light to the second waveguide core; and
irradiating the material of the self-written waveguide with the resin curing light to increase a refractive index of the material of the self-written waveguide and form a core of the self-written waveguide.

8. The method according to claim 7, wherein a width of the first waveguide core decreases with respect to a traveling direction of the resin curing light.

* * * * *